Oct. 2, 1951 — C. W. LEGUILLON ET AL — 2,569,935
METHOD AND APPARATUS FOR MAKING COMPOSITE TIRE ARTICLES
Filed Oct. 14, 1948 — 3 Sheets-Sheet 2
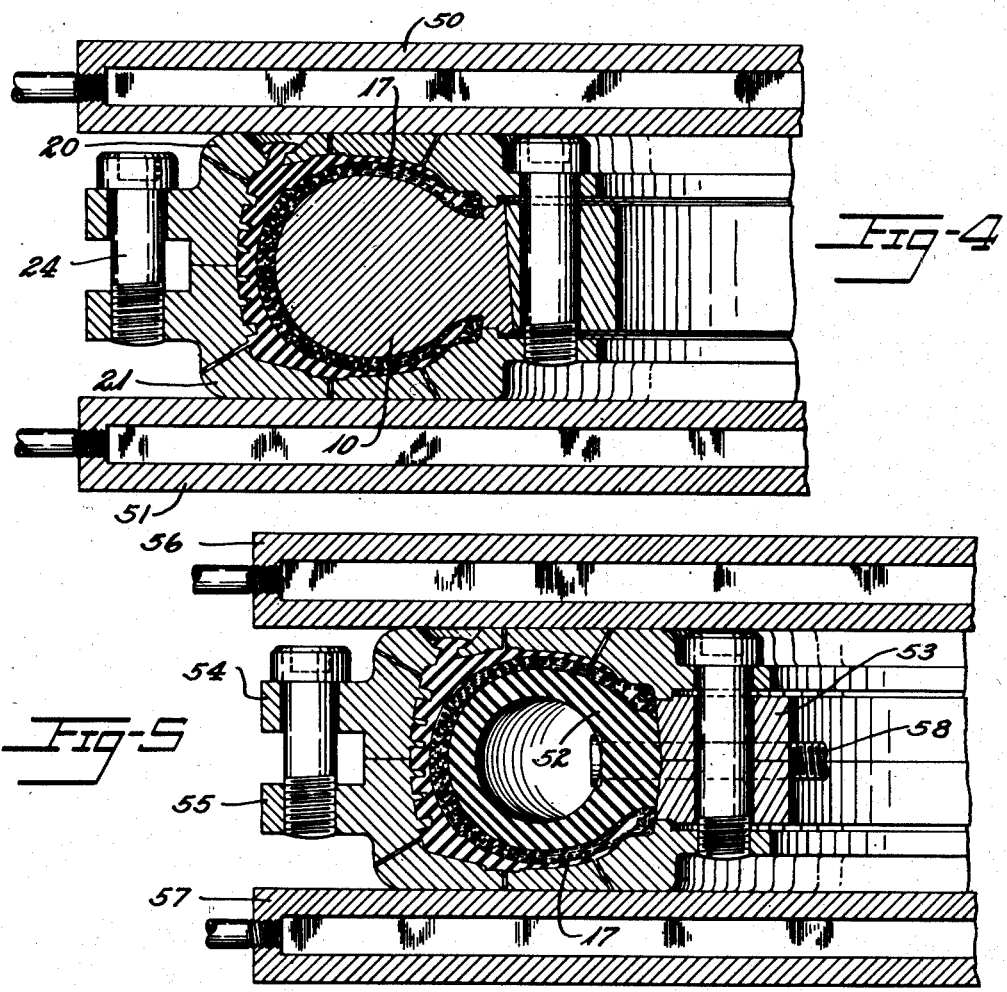
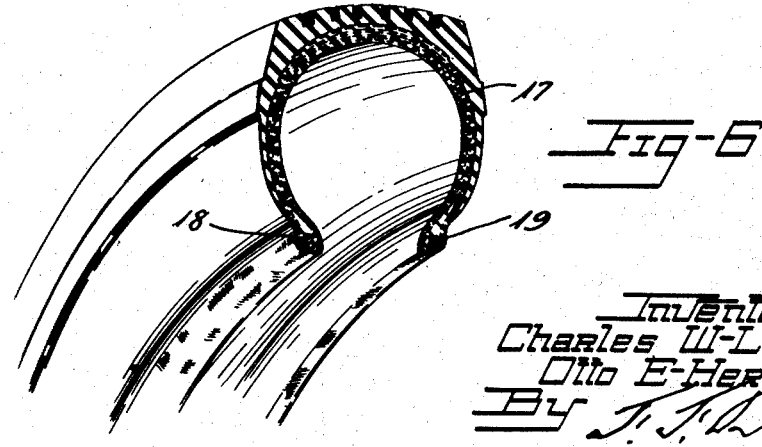
Inventors
Charles W. Leguillon
Otto E. Hermanns
By
Atty.

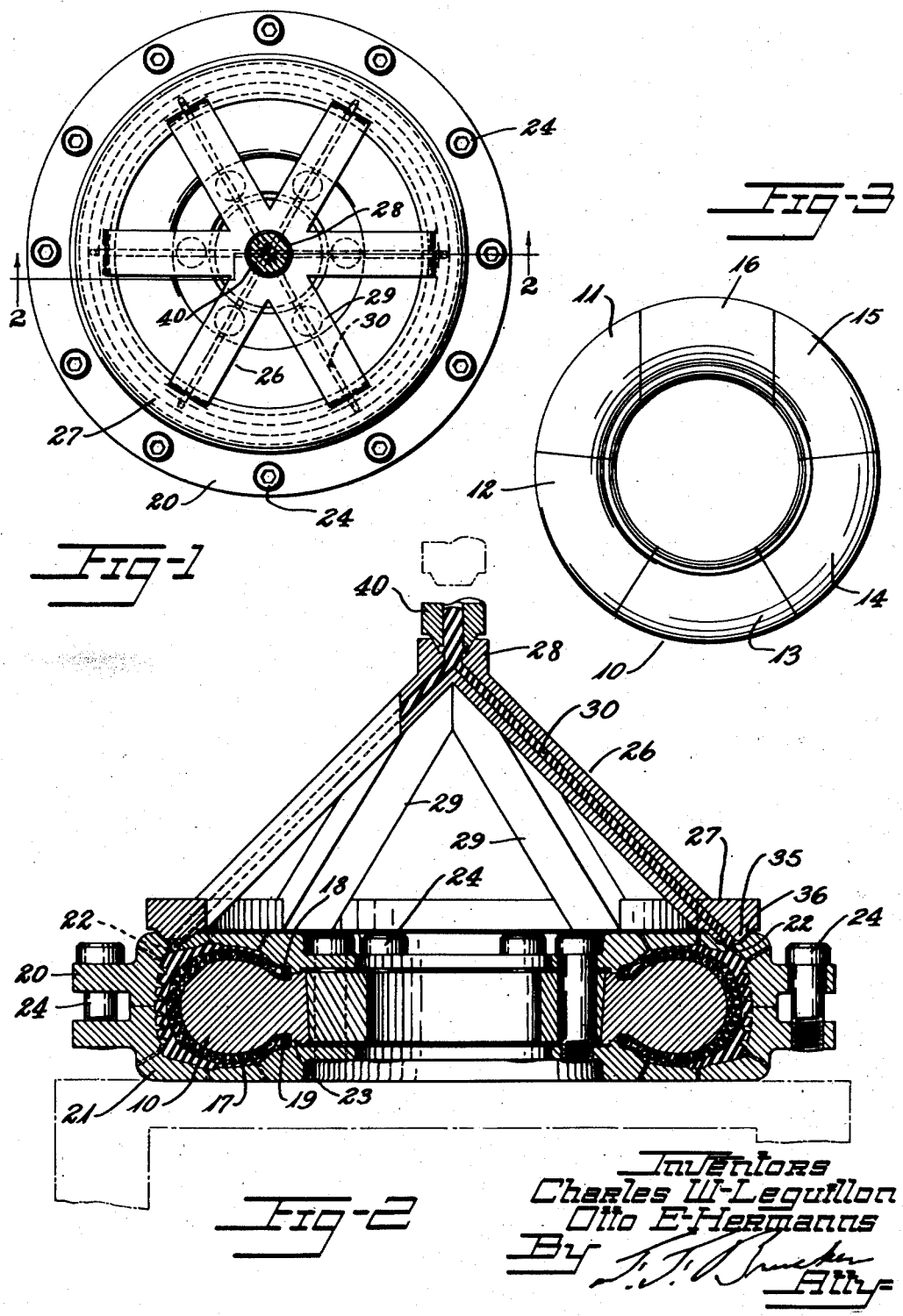

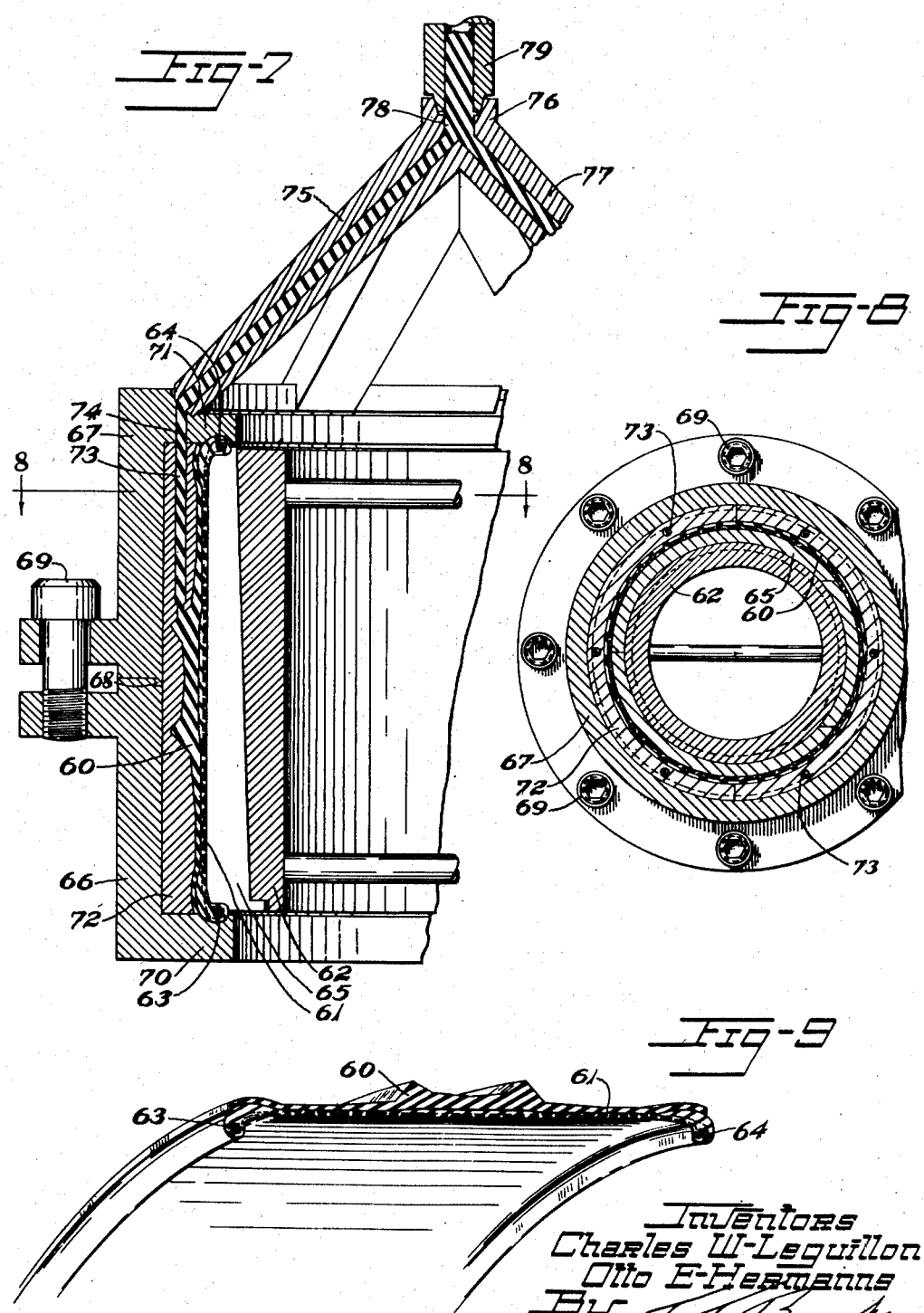

Patented Oct. 2, 1951

2,569,935

UNITED STATES PATENT OFFICE 2,569,935

METHOD AND APPARATUS FOR MAKING COMPOSITE TIRE ARTICLES

Charles W. Leguillon and Otto E. Hermanns, Akron, Ohio, assignors to The B. F. Goodrich Company, New York, N. Y., a corporation of New York Application October 14, 1948, Serial No. 54,372

12 Claims. (Cl. 154—9)

1

This invention relates to the manufacture of composite articles having a fabricated portion of fabric, cords, wires or other ply material and a body of rubber-like material bonded thereto. The invention is especially useful in the manufacture of tire carcasses and other annular tire articles, although the invention is also useful in making other composite articles.

Heretofore in the manufacture of tire casings it has been proposed to assemble ply material such as rubberized fabric or cord fabric material with bead cores about a collapsible core, to form separately a slab of unvulcanized rubber material, to apply the slab circumferentially of the carcass, and then to vulcanize the tire upon the collapsible core.

It has also been proposed heretofore to assemble ply material, such as fabric or cord fabric and bead cores, about a flat faced drum, then to separately form a slab of tread and sidewall material, to apply the slab to the drum about the plied material of the carcass, to remove the carcass so formed from the drum, to form the carcass to the shape of a tire, to insert an expansible forming bag therein, to enclose the entire assembly in a mold, and to vulcanize the carcass in the mold. In the procedures heretofore mentioned, the slab of rubber-like material for forming the tread and sidewalls of the tire casing have been separately formed either by extrusion or by calendering and have then been stored in order to permit shrinkage of the slab, the slab has been cut to length, has been skived or bevelled at its mating ends, and has then been applied to the separately prepared carcass.

Difficulties have been experienced in the aforedescribed methods in that during the handling and storage of the slab, blooming of the rubberlike material and accumulation of dust or moisture upon the surface of the slab have greatly interfered with the adhesion or bonding of the slab to the carcass of the tire. Furthermore the splicing of the ends of the slab has been difficult and separation has often occurred in the region of the splice during use of the tire.

Where the desired tire has included a tread of skid-resisting protuberances of great depth, difficulty has also been experienced in placing the tires in the molds, due to the fact that it has been necessary to provide sufficient material at the tread portion of the tire to form such protuberances and displacement of such material has necessarily resulted from forcing the tire into the mold.

The present invention has for an object the overcoming of the foregoing and other difficulties.

2

Other objects are to provide for enclosing the ply portion or carcass of the tire or other article in a mold before assembly of the rubber-like material therewith, to provide for injection of the rubber-like material into intimate bonding relation with the carcass in the desired final form of the rubber-like portion, to form the tread and sidewall portions of the tire as a continuous annular article in situ and without splicing; to provide for forming such tread and sidewall portions in contact with the carcass either in flattened form or in fully shaped tire form, to provide for forming the tread and sidewall portions by simultaneous injection of rubber-like material at a plurality of points about the periphery of the carcass, and to provide for vulcanizing the tire in the tread-forming apparatus.

These and other objects will appear from the following description and the accompanying drawings.

Of the drawings:

Fig. 1 is a plan view of apparatus constructed in conformance with and embodying the invention as used for forming the tread and sidewall portions of a tire casing about a carcass supported upon a rigid collapsible core.

Fig. 2 is a cross section thereof taken upon line 2—2 of Fig. 1.

Fig. 3 is a plan view of the rigid collapsible core.

Fig. 4 is a sectional view of the apparatus with the injection means removed and with the mold inserted between heated platens for vulcanizing the tire.

Fig. 5 is a view similar to Fig. 4 showing a modification in which the collapsible core is replaced by an expansible bag.

Fig. 6 is a perspective view of a section of a tire resulting from the practice of the procedure and using the apparatus of the invention.

Fig. 7 is a cross sectional view of a modified form of the invention in which the tire is supported upon a building drum and the tread and sidewall portions are formed in situ thereupon.

Fig. 8 is a cross section of the apparatus of Fig. 7 taken on line 8—8 thereof.

Fig. 9 is a perspective view of a cross section of the flat carcass with the tread and sidewall portions formed thereon.

Referring to the drawings, and first to Figs. 1 to 3 thereof, the carcass supporting member 10 is an annular ring of stiff material such as metal and may comprise assembled sections 11, 12, 13, 14, 15 and 16, which may be secured together by any desired means, and the core is of such a shape in cross section as to correspond to the interior of the tire casing. The sectional construction permits assembly or disassembly of the core within or from a formed tire casing, one of the sections 16 being a key section, the removal of which permits the other sections to be readily disassembled.

The tire carcass 17 is of the usual construction comprising laminated plies of square woven or cord fabric, in which the cords may be of cotton, rayon, nylon, stranded metal wire, or other reinforcing material, and bead cores 18, 19. This tire carcass may be constructed by assembly of its component parts upon the collapsible core of Fig. 3, or may be formed upon a drum as a band, removed from the drum, formed by differential pressure to tire shape, and then the collapsible core 10 may be assembled therein.

For enclosing a space about the tire carcass defining a cavity of the shape of the desired tread and the sidewalls, an annular mold comprising mating mold halves 20, 21 is provided. This mold has a plurality of gates or openings 22 for filling the mold by injection and these gates are distributed substantially uniformly about the mold half 20. The collapsible core 10 has a register 23 for centering the collapsible core, and screw bolts 24 are provided for holding the mold halves 20, 21 in assembled relation. The bolts may be removed when it is desired to remove the finished tire casing from the mold.

For simultaneously filling the tread and sidewall cavity about the tire carcass, a removable wheel-like gate member 26 is provided having an annular rim portion 27, hub 28, and spokes 29 extending from the hub to the rim. The spokes are hollow, so as to provide conduits 30 connected to a central cavity in the hub 28 at the ends of the spokes and terminating at the gates 22 of the mold member 20. Preferably the rim portion has conical nozzles 35 formed thereon about the gates therein for seating in corresponding entrance cavities 36 formed in the mold member 20 at the gates 22, thereby providing tight connections between the gate member and the mold. A nozzle 40 of an injection molding apparatus is provided for coupling to the hub 28 of the filling member. The arrangement is such that with the gate member in position on the mold, plastic rubber-like material from the nozzle 40 may be forced through the gates 30 and 22 into direct engagement with the tire carcass to fill the tread and sidewall molding cavity and thereby to form the rubber-like portion of the tire in situ and in good bonding relation to the carcass.

In Fig. 4, the filling apparatus has been removed from the mold and the mold with the tire casing therein is shown as placed between steam heated platens 50, 51 whereby the mold is heated to vulcanize the tire casing.

Where it is desired to form the carcass of the tire by the band or drum type method the carcass 17, after being assembled on the flat drum, may be removed therefrom and formed by differential pressure in the well-known manner and an expansible bag 52 is then placed therein. The bag with the carcass thereon may be supported by a metal ring 53 as shown in Fig. 5, and the bag 52, carcass 17, and supporting ring 53 may then be placed between mold halves 54, 55 identical with the mold halves 20, 21 previously described. The bag 52 may then be inflated to support the tire casing, and the mold comprising the mold halves 54, 55 may be filled in the same manner as the mold of Fig. 2. After filling of the mold with rubber-like material to form the tread and sidewall portions of the tire, the mold may be placed between curing platens 56, 57 and vulcanizing heat applied thereby to the mold for vulcanizing the tire. The expansible bag 52 has a valve opening 58 which, if desired, may be connected to a source of fluid pressure during such vulcanization of the tire to maintain pressure within the tire.

Referring to Figs. 7 to 9, which show a modification of the invention, the drawings illustrate the forming of a tread and sidewall portion 60 of plastic, rubber-like material directly upon a flat band carcass 61 supported by an annular drum 62. The drum 62 may be a building drum upon which plies of rubberized material such as fabric or cord, and bead cores 63, 64, have been assembled during the building of the carcass, or the band carcass may be removed from the ordinary building drum and mounted upon a supporting drum 62 having removable sections 65 for supporting the previously fabricated band. The mold is assembled about the tire carcass and as shown comprises mold halves 66, 67 having a register 68 at their meeting faces and having screw bolts 69 for holding them in assembled relation. The mold half 66 is provided with an inwardly directed flange 70 for engaging the tire carcass at one bead portion thereof and the mold half 67 has a similar inwardly directed flange 71 for engaging and sealing off the other bead portion. To permit easy removal of the mold from the tire, segmental mold plates 72 are assembled within the mold halves 66, 67 in abutting relation with each other and their inner surfaces are contoured to provide the desired tread and sidewall contour. A plurality of gates 73 extend from the tread portion of the mold plates 72 to one margin thereof and corresponding gates 74 are formed through the flange 71 where they connect with a removable filling or gate member 75. The filling member 75 has a hub 76 and spoke-like conduits 77 extending therefrom for connection with the gates 74. The hub 76 has a central gate 78 connecting with the conduits 77 and provision is made for coupling the hub to an injection nozzle 79 for filling the mold by simultaneous injection. In this form of the apparatus, the filling or gate member 75 is removed after injection of the rubber-like material, and the mold members 66, 67 are separated by taking out the screw bolts 69. The mold plates 72 are then removed from the tread and the tire having the tread applied thereto is removed from the drum 62 and expanded and vulcanized in an ordinary tire mold employing an expansible bag for providing pressure against the rubber-like material. If desired, the tread may be at least partially vulcanized in the mold before removal from the mold.

In any of the forms of the invention the body of rubber-like material comprising the tread and sidewalls of the tire is formed in a continuous annulus without splice directly against the tire carcass and in intimate bonded relation thereto prior to vulcanization of the tire so that the separating of the rubber material from the carcass during use is substantially eliminated.

Variations may be made without departing from the scope of the invention as it is defined by the following claims.

We claim:

1. The method of making a tire having a rubber covered annular body terminating in spaced-apart bead portions and providing in the completed tire an interior space, which method comprises forming an annular body having spaced-apart bead portions, supporting the said body between said portions on an annular support against collapse in the radially inward direction, surrounding said body and said support by a mold providing an enclosed space of determinate thickness and shape about said body open to the radially outer face of said body, then while said body is thus supported filling the enclosed space with rubber material by injection thereof in plastic form in intimate contact with said body, and subjecting the rubber covered body to a vulcanizing operation while said body and its support are so surrounded.

2. The method of making a tire having a rubber covered annular body of reinforcing material terminating in spaced-apart bead portions and providing in the completed tire an interior space, which method comprises forming an annular body of reinforcing material having spaced-apart bead portions, supporting the said body between said bead portions on an annular support against collapse in the radially inward direction, surrounding said body and said support by a mold providing an enclosed space of determinate thickness and shape about and open to the radially outer face of said body while sealing said space at the bead portions, then while said body is thus supported filling the enclosed space with rubber material in seamless annular form by injection thereof in plastic form in intimate contact with said body, and subjecting the rubber covered body to a vulcanizing operation while said body and its support are so surrounded.

3. The method of making a tire having a rubber covered annular body of reinforcing material terminating in spaced-apart bead portions and providing in the completed tire an interior space, which method comprises forming an annular body of reinforcing material having spaced-apart bead portions, supporting said body between said bead portions from within upon a rigid annular core against collapse in the radially inward direction, surrounding said body and said support by a mold providing an enclosed space of determinate thickness and shape about and open to the radially outer face of said body while clamping said bead portions to said core, then while said body is thus supported by said core and mold filling the enclosed space with rubber material in seamless annular form by injection thereof in plastic form in intimate contact with said body, subjecting the rubber covered body to a vulcanizing operation while said body and its support are so surrounded and removing the tire from said core and mold.

4. The method of making a tire having a rubber covered annular body of reinforcing material terminating in spaced-apart bead portions and providing in the completed tire an interior space, which method comprises forming an annular body of reinforcing material having spaced-apart bead portions, supporting said body between said bead portions from within upon an inflatable form against collapse in the radially inward direction, enclosing a space of determinate thickness and shape about and open to the radially outer face of said body while clamping said bead portions to said form, then while said body is thus supported filling the enclosed space with rubber material in seamless annular form by injection thereof in plastic form in intimate contact with said body, and subjecting the rubber covered body to a vulcanizing operation.

5. The method of making a tire having a rubber covered annular body of reinforcing material terminating in spaced-apart bead portions and providing in the completed tire an interior space, which method comprises forming an annular band of reinforcing material having spaced-apart bead portions, expanding a central peripheral portion of the band radially outward to provide a body having an inwardly open space between the bead portions thereof, supporting the formed body against collapse in the radially inward direction upon an annular sectional support, surrounding said body and said support by a mold providing a space of determinate thickness and shape about and open to the radially outer face of said body while clamping the bead portions thereof, then while said body is thus supported filling the enclosed space with rubber material in seamless annular form by injection thereof in plastic form in intimate contact with said body, subjecting the rubber covered body to a vulcanizing operation while said body and its support are so surrounded and removing the tire from said mold and said support.

6. The method of making a tire having a rubber covered annular body of reinforcing material terminating in spaced-apart bead portions and providing in the completed tire an interior space, which method comprises forming an annular band of reinforcing material having spaced-apart bead portions, supporting said band between said bead portions from within against collapse in a radially inward direction, enclosing a space of determinate thickness and shape about and open to the radially outer face of the band between said bead portions, filling the enclosed space with rubber material by injection thereof in plastic form to provide an annular seamless covering, shaping an annular zone of said band between said bead portions radially outward to provide a body having an annular peripheral space supporting said body from within against collapse in an inward direction and then subjecting said body including said covering to a vulcanizing operation.

7. Apparatus for making a tire article having a rubber covered annular body providing in the completed article an inner peripheral space, said apparatus comprising a sectional annular core for supporting an annular body of reinforcing material having spaced-apart bead portions against collapse in the radially inward direction, mold means cooperating with said core to enclose a space of determinate thickness and shape thereabout, means for filling the enclosed space with rubber material by injection thereof in plastic form to provide an annular seamless covering about said body, and heating means cooperating with said mold means for subjecting said body and said covering while thus supported and enclosed to a vulcanizing operation.

8. Apparatus for making a tire article having a rubber covered annular body providing in the completed article an inner peripheral space, said apparatus comprising an expansible annular bag for supporting an annular body of reinforcing material having spaced-apart bead portions against collapse in the radially inward direction, mold means cooperating with said bag to enclose a space of determinate thickness and shape thereabout, means for filling the enclosed space with rubber material by injection thereof in plastic form to provide an annular seamless covering about said body, and means for subjecting said body and said covering while thus supported and enclosed to a vulcanizing operation.

9. Apparatus for making a tire article having a rubber covered annular body providing in the completed article an inner peripheral space, said apparatus comprising a collapsible annular building drum for supporting an annular body of reinforcing material having spaced-apart bead portions against collapse in the radially inward direction, mold means cooperating with said building drum to enclose a space of determinate thickness and shape thereabout, means for filling the enclosed space with rubber material by injection thereof in plastic form to provide an annular seamless covering about said body, and means for subjecting said body and said covering while thus supported to a vulcanizing operation.

10. Apparatus for making a tire article having a rubber covered annular body providing in the completed article an inner peripheral space, said apparatus comprising a collapsible annular segmental core for supporting an annular body of reinforcing material having spaced-apart bead portions against collapse in the radially inward direction, mold means having an annular cavity of the shape of the desired tire cooperating with said segmental core to enclose a space of determinate thickness and shape thereabout and having sealing portions for engaging said bead portions, means for filling the enclosed space with rubber material by injection thereof in plastic form to provide an annular seamless covering about said body, and means for subjecting said body and said covering while thus supported to a vulcanizing operation.

11. Apparatus for making a tire article having a rubber covered annular body and an inner peripheral space, said apparatus comprising a collapsible segmental annular core having the cross section of said space for supporting thereabout an annular body of reinforcing material having spaced-apart bead portions against collapse in the radial inward direction, a circumferentially divided tire mold defining an annular cavity corresponding in shape with the desired tire and cooperating with said core to enclose a space about said reinforcing material of determinate thickness and space to be filled with rubber material, means for filling the enclosed space with rubber material by injection thereof in plastic form to provide an annular seamless covering about said body, and means for vulcanizing the tire while it is confined in said mold.

12. The method of making a tire article having a rubber covered annular body and an inner peripheral space which comprises forming an annular body of reinforcing material having an inner peripheral space, supporting said body from within said space by a segmental core, assembling the halves of a circumferentially divided mold about said body and said core to confine a space about said body for filling, filling said space with rubber material in plastic condition under pressure through small openings of the mold by flow directly upon said body of reinforcing material, vulcanizing the article while it is confined in the mold and removing the tire article from said mold and said segmental core.

CHARLES W. LEGUILLON.
OTTO E. HERMANNS.

REFERENCES CITED

The following references are of record in the file of this patent:

UNITED STATES PATENTS

| Number | Name | Date |
|---|---|---|
| 1,375,214 | Darrow | Apr. 19, 1921 |
| 1,375,543 | Trump | Apr. 19, 1921 |
| 1,612,566 | Brown | Dec. 28, 1926 |
| 1,681,713 | Thurlow | Aug. 21, 1928 |
| 2,313,035 | Breth | Mar. 9, 1943 |
| 2,422,266 | Steinke | June 17, 1947 |
| 2,476,884 | Maynard | July 19, 1949 |